H. H. MAPELSDEN.
FLOW METER.
APPLICATION FILED AUG. 10, 1916.
1,291,056.
Patented Jan. 14, 1919.
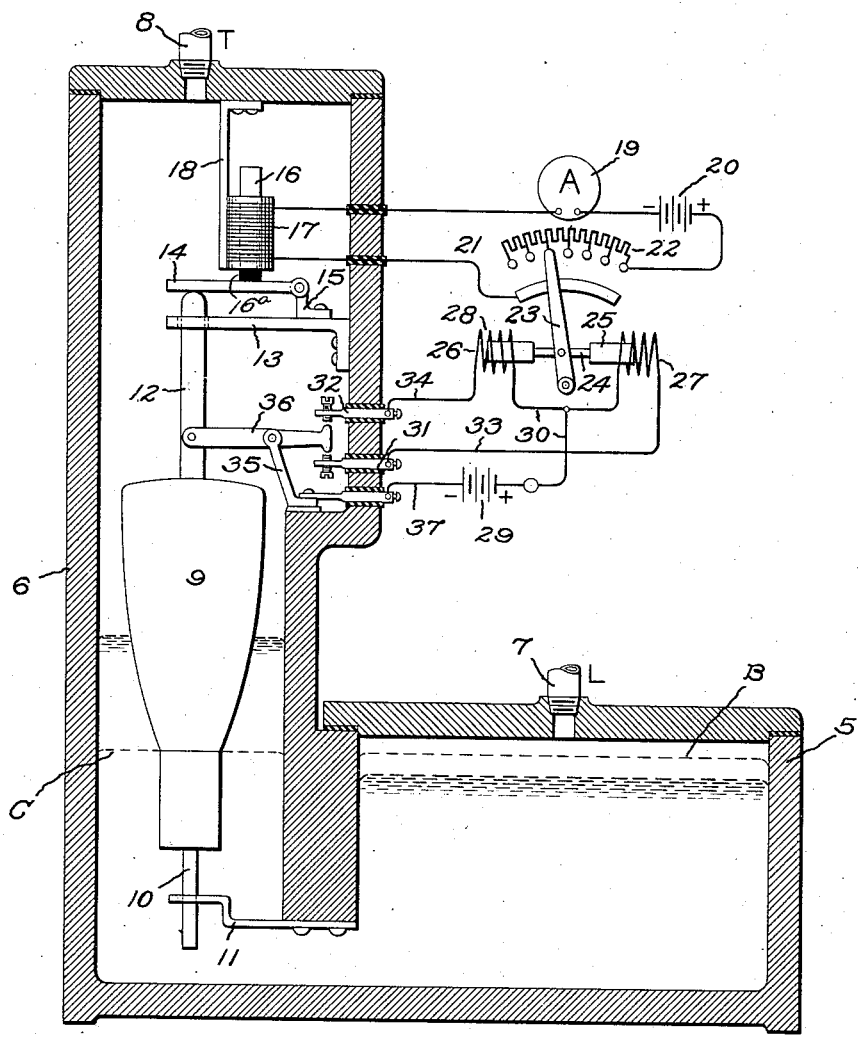
Inventor:
Harold H. Mapelsden,
by
His Attorney.

UNITED STATES PATENT OFFICE.

HAROLD H. MAPELSDEN, OF SCHENECTADY, NEW YORK, ASSIGNOR TO GENERAL ELECTRIC COMPANY, A CORPORATION OF NEW YORK.

FLOW-METER.

1,291,056.     Specification of Letters Patent.     Patented Jan. 14, 1919.

Application filed August 10, 1916. Serial No. 114,190.

*To all whom it may concern:*

Be it known that I, HAROLD H. MAPELSDEN, a citizen of the United States, residing at Schenectady, county of Schenectady, State of New York, have invented certain new and useful Improvements in Flow-Meters, of which the following is a specification.

The present invention relates to flow meters of the type comprising a U-tube manometer, the two legs of which are subjected to pressures the difference between which bears a certain definite relation to the rate of flow.

One object of the invention is to provide an improved pressure actuated mechanism for a meter of this type.

As is well known, the devices used for creating a pressure difference which varies with the rate of flow do not create a pressure difference which is a straight line function of the flow, and a further object of the invention is to provide an improved mechanism in which the indicating instrument will have a uniform scale.

In the drawing the figure is a sectional elevation partly diagrammatic illustrating an embodiment of my invention.

Referring to the drawing, 5 indicates the one leg of a U-tube manometer and 6 the other, the same containing a certain amount of suitable indicating fluid, as mercury. It will be understood that this manometer will be connected to the conduit through which the fluid to be metered flows by pipes which lead to any suitable pressure difference creating device, as a Venturi tube, or a Pitot tube. 7 indicates the leading or high pressure pipe and 8 the trailing or low pressure pipe. Located in the leg 6 is a float 9 having at its lower end a rod 10 which passes loosely through an opening in a bracket 11, and at its upper end a rod 12 which passes through an opening in a bracket 13. These rods tend to maintain the float in a central position in the leg 6 and to guide it in its limited movement. Bearing on the top of the rod 12 is the free end of a lever 14 pivoted to a bracket 15, and bearing against the lever 14 is the armature or plunger 16 of an electro-magnet 17, which magnet is carried by a fixed bracket 18. The lower portion of plunger 16 is formed of insulating material as indicated at 16ᵃ. The magnet 17 is connected in series with a suitable current responsive instrument as an ammeter 19, source of electric energy 20, and variable resistance 21. The ammeter 19 may be of any suitable type. For example, an indicating and recording ammeter may be used so that it will indicate the flow and also make a record of it. The variable resistance 21 may be of any suitable type, and in the present instance it is shown diagrammatically as comprising a resistor 22 divided into sections which are adapted to be cut into and out of circuit by the movement of the contact arm 23, as is obvious. Connected to the contact arm 23 for moving it is a rod 24 having on one end a plunger 25 and on the other a plunger 26 which are adapted to be moved by electro-magnets 27 and 28 respectively. One terminal of each of the electro-magnets 27 and 28 is connected to one side of a source of electrical energy 29 by conductors 30, and the other terminals are connected to the two-spaced contacts 31 and 32 by conductors 33 and 34. Pivoted on a bracket 35 is a contact arm 36, one end of which projects between the spaced contacts 31 and 32, and the other end of which is pivoted to the rod 12. The other terminal of the source of electrical energy 29 is connected to contact arm 36 by conductor 37.

In operation, at times of no flow, the pressures on the two legs 5 and 6 of the manometer will be the same and the mercury or other fluid therein will stand at the same level as indicated by the lines B and C. This is the zero point of the instrument, and at such time the float 9 will stand in equilibrium in the position indicated and the contact arm 23 will be moved to the left so that the circuit of electro-magnet 17 is open. Contact arm 36 will also be standing in the position shown where it is out of engagement with contacts 31 and 32. If now a difference in pressure occurs on the two legs of the manometer such that the level of the fluid in the leg 5 lowers and that in the leg 6 rises, then the equilibrium of the float 9 will be disturbed and it will tend to rise. This will move the contact arm 36 into engagement with contact 31 and close the circuit through electro-magnet 27, which magnet will act on its plunger 25 and bring the contact arm 23 into engagement with resistor 22. This will close the circuit of electro-magnet 17 which will be energized and draw its plunger down against lever arm 14 and force the float 9 down so as to move contact arm 36 out of engagement with contact 31. The parts of the mechanism will come to rest when the resistance in the circuit of electro-magnet 17 is such that the current flowing through the electro-magnet 17 energizes it sufficiently to overcome the tendency of the float 9 to rise due to its buoyancy, and, as will be clear, the amount of current required will depend on the difference in pressure on the two legs of the manometer which in turn is a function of the rate of flow of the fluid being metered. The reading of the ammeter 19 is proportional to the flow, and it may be calibrated directly in terms of flow if desired. The total amount of current flowing may be integrated by a suitable meter as is obvious. In case the flow decreases the level of the fluid in the leg 9 will lower decreasing its buoyant action on the float 9 which will be forced downward by the plunger 16 of electro-magnet 17 and bring the contact arm 36 into engagement with contact 32. This will close the circuit of electro-magnet 28 which will move its plunger 26 and central arm 23 to the left, thus cutting more resistance into the circuit of electro-magnet 17 and decreasing the current therein. The float 9 will then rise and move contact arm 36 out of engagement with contact 32.

As already stated, the pressure difference created by the known form of pressure difference creating devices is not a straight line function of the rate of flow, and in order to obtain a uniform scale I so form the contour of the conduit between the float 9 and the inner wall of the leg 6 that it varies in cross-section in such a manner that equal variations in the flow of the fluid being metered will cause such a deflection of the indicating fluid as to increase the buoyancy of the float so that equal increases in the amount of current necessary to counteract the increase in buoyancy will be required. To this end I preferably make the float tapered or bell-shaped, as shown, and the inner wall of the leg 6 cylindrical, although I may use other arrangements to produce the same result.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In an apparatus of the character described, the combination of a U-tube manometer casing, an indicating fluid therein, a float in one leg of the manometer casing partly submerged in said fluid, an electro-magnetic means located in such leg comprising a coil and armature movable relatively to each other and operatively connected to said float, an electric circuit for the coil, a resistance therein, and means for varying said resistance whereby the current flowing in said circuit may be regulated so that the electro-magnet will be energized to exactly counter-balance the buoyancy of the float produced by changes in the level of said indicating fluid.

2. In an apparatus of the character described, the combination of a U-tube manometer casing, an indicating fluid therein, a float in one leg of the manometer casing partly submerged in said fluid, an electro-magnetic means located in such leg comprising a coil and armature movable relatively to each other and operatively connected to said float, an electric circuit for the coil, a resistance therein, and means controlled by a movement of the float for varying said resistance whereby the current flowing in said circuit may be regulated so that the electromagnetic means will be energized to exactly counterbalance the buoyancy of the float produced by changes in the level of said indicating fluid.

3. In an apparatus of the character described, the combination of a U-tube manometer casing, an indicating fluid therein, a float in one leg of the manometer casing partly submerged in said fluid, an electro-magnetic means located in such leg comprising a coil and armature movable relatively to each other and operatively connected to said float, an electric circuit for the coil, a resistance therein, and electro-magnetic means controlled by a movement of the float for varying said resistance whereby the current flowing in said circuit may be regulated so that the first named electromagnetic means will be energized to exactly counterbalance the buoyancy of the float produced by changes in the level of said indicating fluid.

4. In an apparatus of the character described, the combination of a U-tube manometer casing, an indicating fluid therein, a float in one leg thereof partly submerged in said fluid, an electromagnetic means located in such leg, and means for energizing the electromagnetic means to cause it to counterbalance the buoyancy of said float produced by changes in the level of the fluid, the contour of the space between the float and the inner wall of the leg of the U-tube being such that equal changes in the flow of the fluid being metered require equal changes in the amount of energizing means for said electromagnet in order to counterbalance exactly the buoyancy of said float.

5. In an apparatus of the character described, the combination of a U-tube manometer casing, an indicating fluid therein, a float in one leg of the manometer casing partly submerged in said fluid, an electromagnetic means having its movable element operatively connected to said float, an electric circuit for the electromagnetic means, a resistance therein, and means controlled by a movement of the float for varying said resistance whereby the current flowing in said circuit may be regulated so that the electromagnetic means will be energized to exactly counter-balance the buoyancy of the float produced by changes in the level of said indicating fluid, the contour of the space between the float and the inner wall of the leg of the U-tube being such that equal changes in the flow of the fluid being metered require equal changes in the amount of current flowing in said circuit in order to counterbalance exactly the buoyancy of said float.

6. In an apparatus of the character described, the combination of a U-tube manometer casing, an indicating fluid therein, a float in one leg of the casing partly submerged in said fluid, an electromagnetic means, a circuit for the electromagnetic means, means for varying the current flowing in said circuit whereby the electromagnetic means may be energized so as to exactly counter-balance the buoyancy of said float produced by changes in the level of the fluid, and means in the circuit for measuring the value of the current flowing therein, the contour of the space between the float and the inner wall of the leg of the U-tube being such that equal changes in the rate of flow of the fluid being metered require equal changes in the amount of current flowing through said circuit in order to counterbalance exactly the buoyancy of said float.

In witness whereof, I have hereunto set my hand this 7th day of August, 1916.

HAROLD H. MAPELSDEN.